Patented Oct. 5, 1954

2,691,035

UNITED STATES PATENT OFFICE 2,691,035

PREPARATION OF PHYTIC ACID AND
SOLUBLE SALTS THEREOF

McCalip J. Thomas, Decatur, Ill., assignor to A. E.
Staley Manufacturing Company, Decatur, Ill.,
a corporation of Delaware No Drawing. Application February 9, 1951,
Serial No. 210,279

9 Claims. (Cl. 260—461)

This invention relates to the preparation of phytic acid and water-soluble phytate salts from water-insoluble phytate salts.

Phytic acid is a phosphoric acid ester of inositol, in which each of the six hydroxyl groups in inositol has been esterified with a molecule of orthophosphoric acid. Since orthophosphoric acid is a tribasic acid and since only one hydrogen is affected in the esterification with the hydroxyl group of the inositol, each molecule of phosphoric acid is still functional as a dibasic acid. Since there are six of these phosphoric acid molecules now associated with inositol in the ester, the ester functions as a dodecabasic acid. As such, the phytic acid is capable of forming salts in which metallic and other positive ions may replace hydrogen in the acid in varying degrees, up to the limit of replacing all twelve hydrogen atoms.

The most widely occurring salt of phytic acid is phytin, found in many plants, especially in the seeds. One of the best sources of phytin is corn steepwater, the liquor obtained in the corn wet-milling process. Phytin is a generic term covering the salts containing calcium and magnesium, but sodium, potassium and other metals are ordinarily present in the naturally-occurring salts.

Phytin is classed as a water-insoluble substance, only a very small fraction of one part being soluble in a hundred parts of water. Calcium phytate, for example, dissolves in water only to the extent of about one milligram (0.001 g.) per 100 g. of water at room temperature; the solubility does not change appreciably with increasing temperature. Substances of this type are variously referred to as insoluble, sparingly soluble, difficulty soluble, or very slightly soluble.

Phytin is the raw material which has commonly been used in various processes for the preparation of phytic acid and water-soluble phytate salts. There are only a very few processes of this type, and they are quite laborious, cumbersome and costly.

One of the prior art processes is to dissolve phytin in hydrochloric acid, and by the addition of a soluble copper salt precipitate an insoluble copper phytate; this compound is then slurried in water and the slurry saturated with hydrogen sulphide, whereupon the copper is precipitated as very insoluble copper sulphide and phytic acid is formed and remains in solution. If water-soluble salts are desired, e. g. sodium phytate, this phytic acid is then neutralized with sodium hydroxide. The acid or salt obtained is not pure because the copper phytate precipitated in the process is not a pure copper phytate, having other metals in it which were originally present in the phytin.

Another process which has been used is to dissolve the phytin in hydrochloric acid, remove some of the calcium and the magnesium by the use of a precipitating agent such as oxalic acid, and then add large quantities of alcohol to precipitate an acid phytate salt. The product obtained is a water-soluble salt of phytic acid, in which some of the acid hydrogen atoms have been replaced with metal atoms.

It is a principal object of this invention to provide an improved method for the preparation of phytic acid.

Another object is to provide an improved method for the preparation of water-soluble salts of phytic acid.

In a co-pending application, an invention is set forth for a process of preparing water-soluble phytate salts and phytic acid from water-insoluble phytate salts, in which an ion exchange resin operating on the hydrogen cycle is used to solubilize the water-insoluble phytate salt.

The present invention is for a new and unobvious process of preparing water-soluble phytate salts and/or phytic acid from water-insoluble phytate salts wherein a phytic acid solution is used to solubilize and convert the water-insoluble phytate salt to a water-soluble acid phytate salt and this solution then may be contacted with ion exchange resin operating on the hydrogen cycle to remove some or all of the metal ions present in the acid salt and form more strongly acid phytate salts or ultimately metal-free phytic acid.

The utility of the invention described herein lies in the fact that water-insoluble phytate salts can be converted to water-soluble phytate salts of varying metal ion content and thus varying degrees of acidity. In fact, the process allows the complete removal of metal ions to form the free acid, which is known as phytic acid.

The various water-soluble phytates potentially available by the application of this invention are of importance because they open up an entirely new field for investigation. Such salts have not been readily prepared and were only obtained in most cases as experimental products in research investigations, and then only resulting from the application of tedious chemical methods. Heretofore, there has not been developed a systematic process for the production of water-soluble phytates or phytic acid from water-insoluble phytates.

The availability of a series of such salts and of the free acid opens up a new avenue for investigations, such as the production of substances for water softening, the production of mixed metal ion salts, scavenger agents for removal of heavy metals, esters containing metal ions, salts of high acidity for use as an ingredient of baking powders, pharmaceutical use or as a fire-proofing agent for textiles. The free acid lends itself to the preparation of various esters which might have use in the industrial field as plasticizers or for pharmaceutical use.

An important feature of the invention is that a water-insoluble phytate such as phytin is solubilized with phytic acid, yielding a solution of a water-soluble acid phytate salt. The nature of this acid salt, with respect to the proportion of hydrogen ion to metal ion present, depends upon the quantitative ratio of the water-insoluble phytate used to the phytic acid used. Thus, the higher the ratio of phytic acid, the more strongly acid will be the acid salt formed in the solubilization reaction.

Whatever the metal content of the water-soluble acid phytate salt produced may be, it may be reduced still farther or totally eliminated, as the choice may be, by the following step of contacting the solution with ion exchange resin operating on a hydrogen cycle.

Prior methods used in investigations on the structural aspects of phytin involved tedious and long, drawn-out chemical schemes, some of which led to the isolation of acidic salts of phytin. As stated, however, these were merely experimental in nature, with no serious attempts to make products on a commercial scale. Such processes lead to contamination of the desired product with metals, the nature of which depend on the materials employed. The invention described herein cannot lead to contamination of the desired product since no chemicals are required in the main part of the process. The only point where any chemicals are required is in the resin regeneration step, where an acid is used to remove the metal ions from the resin. This step, however, is independent of the cation exchange stage which, obviously, is conducted separately.

The process of the present invention may be carried out by adding phytin, or other water-insoluble phytate salts, to a phytic acid solution and agitating until no more phytin dissolves. The mixture is then filtered, and the filtrate heated for at least a few minutes at an elevated temperature to insolubilize impurities. If this heating step is not effected, these impurities will gradually precipitate out on prolonged standing, and the heating serves to accelerate this reaction and purify the solution. Preferably, the heating is conducted at a temperature of at least 150° for a period of at least about 10 minutes. Completion of this precipitation reaction appears to involve the two independent variables of time and temperature. In the preparation of more strongly acid phytate salts, this heating step may alternatively be effected after contacting the solution with ion exchange resin.

The acid phytates salt solution is now contacted with acid-regenerated ion exchange resin to remove some or all, as the choice may be, of the metal ions present in the phytate molecule. This contacting with the resin may be effected by either a batch or a column process. The former method is preferable for producing acid phytate salts and the latter is preferable for producing phytic acid. Where it is desirable to remove only a portion of the metal ions present in the phytate molecule, so as to obtain an acid phytate salt, the proportion of resin to phytate is regulated so as to obtain the desired result. An alternative method is to use a sufficiently large proportion of resin to remove all of the metal ions and convert the salt to phytic acid, after which the acid may be neutralized to any desired extent with the appropriate metal compound, such as the hydroxide or carbonate.

After the resin contacting step, the resin is separated and the solution may then be treated with decolorizing carbon, followed by concentration through evaporation. It is desirable to perform this evaporation under reduced pressure, especially in the case of a phytic acid solution, in order to keep the temperature down and thus minimize the development of color. The treatment with decolorizing carbon may be effected either before or after evaporation, or may be done after partial evaporation.

When acid phytate salts are being prepared, the purification step involving heating may be combined with the decolorizing step, permitting the precipitated impurities and the carbon to be removed in one filtration. This combined operation may be effected either before or after the ion exchange step.

In any case, the acid phytate salt may be recovered from its solution by a drying procedure or by precipitation with an organic solvent such as methanol, ethanol, acetone, or any other solvent which is soluble in water and in which the salt is insoluble. Methanol and ethanol are preferable, methanol being the first choice. Upon precipitation with a solvent, a dense, white, crystalline material separates which may be readily filtered off, washed with fresh solvent and then dried in an oven.

In preparing phytic acid, the purification step may be omitted. Also, the organic solvent precipitation step is omitted, since phytic acid is completely soluble in most of the solvents. The evaporation is carried out until a heavy syrup is obtained.

Any hydrogen exchange resin may be used in this process. One resin used in this work was Duolite C-3 cation exchanger. The exchanger was always used in the hydrogen form. Other resins in the hydrogen form which may be used are Amberlite IR-100, Nalcite HCR, and Dow-X-50. There are others which may be added to this list. Duolite C-3 and Amberlite IR-100 are sulfonated polyphenols and Nalcite HCR and Dow-X-50 are sulfonated polystyrenes. It must be taken into account in using these resins that the capacities for adsorbing the metal ions may vary widely and as a result the same volume of the different resins will not produce the same degree of reaction. The exhausted ion-exchange resins are all readily regenerated with acid and are then ready for re-use in this process.

The following examples illustrate the invention:

EXAMPLE 1

*Preparation of soluble acid phytate salt*

Calcium phytate containing 14.1% moisture, 22.6% calcium, 20.4% total phosphorous, 18.5% organic phosphorous, 0.07% total nitrogen and 0.49% solubles was used.

100 g. (dry substance basis (d. s. b.)) of this phytate was slurried at room temperature for one hour with 1 l. of phytic acid solution, the undissolved phytate filtered off and the filtrate analyzed. The results are tabulated below:

|  | Baumé (80° F.) | Solids (g./100 ml.) | pH | Calcium (g./100 ml.) |
|---|---|---|---|---|
| Phytic Acid Sol'n | 3.15 | 4.26 | 1.4 | 0 |
| Final Solution | 8.8 | 9.79 | 3.7 | 1.27 |

The acid phytate salt solution was then heated to 195° for five minutes, filtered to remove a precipitate which had formed and treated with 5 g. of decolorizing carbon. After removal of the carbon, the solution was evaporated under reduced pressure to a syrupy consistency, and then added slowly to a quantity of vigorously agitated methanol. A white crystalline salt separated, removed by filtration, washed with several portions of methanol and dried in an oven. The salt, containing 14.3% calcium, was quite water-soluble and a solution of 1 g. in 10 ml. of water gave a pH of 3.1.

EXAMPLE 2

*Preparation of soluble acid phytate salt*

Another 100 g. portion of the phytate used in Example 1 was slurried into 1 l. of a phytic acid solution, more concentrated than in Example 1, and agitated for about 30 minutes at 150° F., the undissolved phytate filtered off and the filtrate analyzed. The results are tabulated below:

|  | Baumé (80° F.) | Solids (g./100 ml.) | pH | Calcium (g./100 ml.) |
|---|---|---|---|---|
| Phytic Acid Sol'n | 5.2 | 7.12 | 1.2 | 0 |
| Final Solution | 14.2 | 16.86 | 3.6 | 2.11 |

To the salt solution was now added 600 cc. of moist, acid-regenerated Duolite C-3 cation exchange resin and this mixture was then agitated at room temperature until the pH of the slurry was constant at 2.4. The resin was removed by filtration, washed with water and the washings combined with the main filtrate.

The solution was then evaporated under reduced pressure to about half its original volume, 5 g. of decolorizing carbon added and the mixture heated for about 20 minutes at 150° F. The mixture was then filtered to remove the precipitate, which had formed, and the carbon, after which it was further evaporated under reduced pressure to a syrupy consistency. This syrup was then added to a quantity of vigorously agitated ethanol, whereupon a white, crystalline salt was precipitated. This salt, containing 8.7% calcium, was quite water-soluble and a 10% solution gave a pH of 2.4.

EXAMPLE 3

*Preparation of phytic acid*

Phytin (100 g., d. s. b.) analyzing 15.6% moisture, 5.2% calcium, 11.3% magnesium, 21.8% total phosphorous, 19.6% organic phosphorous and 0.3% total nitrogen was slurried for about 45 minutes with 1 l. of a 10% phytic acid solution. The slurry was then filtered to remove undissolved phytin, the residue washed and the washings combined with the filtrate.

This solution was then evaporated, to about half its original volume, at about 400 mm. (mercury) pressure and then filtrated to remove a precipitate which had formed.

The filtrate was now passed through a large column of moist, acid-regenerated ion exchange resin (Amberlite IR-100). The effluent solution of phytic acid was completely free of all metal ions as shown by appropriate qualitative tests. This solution of phytic acid was then evaporated to a heavy syrup.

Obviously, the "phytic acid" used in the process of this invention to solubilize the water-insoluble phytates need not be totally metal-free in order to function properly. That is, a solution of a highly acid phytate salt can also be used. Such a solution, incompletely freed of metal ions, may be loosely referred to as "phytic acid," but of course is not strictly so until all metal ions are replaced with hydrogen. Experiments showed that such acid salt solutions have less capacity for dissolving the insoluble phytates, as would be expected, since their acidic capacity is reduced by the presence of metal ions. This reduction in capacity obviously depends on the proportion of metal ions to hydrogen ions present. Nevertheless, highly acid phytate salt solutions do solubilize insoluble phytate salts, but are not the preferred reagent due to a lower acid capacity.

It is, of course, a matter of choice as to whether or not the acid salt solutions and phytic acid solutions obtained by the practice of this invention are purified and concentrated by the steps outlined herein. These solutions may be used in the unpurified and/or dilute or partially concentrated state, rather than being converted to a syrupy or solid product.

Many water-insoluble phytate salts have been used in the practice of this invention, including phytins having a wide range of calcium and magnesium content.

That which is claimed as new is:

1. The process of converting a water-insoluble phytate salt to a solution of water-soluble phytate salt comprising preparing a slurry of the water-insoluble phytate, water and a sufficient proportion of phytic acid and agitating said slurry until it is substantially converted to a solution of phytate salt.

2. The process of claim 1 wherein the solution of water-soluble phytate salt is further acidified and its metal content further reduced by the additional step of contacting the solution with an acid-regenerated cation exchange resin, whereby a more acid, water-soluble phytate salt solution is produced.

3. The process of claim 1 wherein the water-soluble phytate salt solution is purified by heating the solution to precipitate impurities and then separating said impurities from the solution.

4. The process of converting a water-insoluble phytate salt to a solution of water-soluble phytate salt comprising preparing a slurry of the water-insoluble phytate, water and a sufficient proportion of a highly acid, water-soluble phytate salt and agitating said slurry until it is substantially converted to a solution of phytate salt.

5. The process of claim 4 wherein the solution of water-soluble phytate salt is further acidified and its metal content further reduced by the additional step of contacting the solution with an acid-regenerated cation exchange resin, whereby a more acid, water-soluble phytate salt solution is produced.

6. The process of claim 4 wherein the water-insoluble phytate salt solution is purified by heating the solution to precipitate impurities and then separating said impurities from the solution.

7. The process of preparing a water-soluble phytate salt from a water-insoluble phytate salt comprising preparing a slurry of the water-insoluble phytate, water and a sufficient proportion of phytic acid and agitating said slurry until the water-insoluble phytate is substantially converted to a water-soluble phytate, separating any undissolved phytate and recovering the water-soluble phytate from the solution.

8. The process of preparing phytic acid from a water-insoluble phytate salt comprising preparing a slurry of the water-insoluble phytate, water and a sufficient proportion of phytic acid, agitating said slurry until the water-insoluble phytate is substantially converted to a water-soluble phytate, and contacting the solution thus obtained with a sufficient proportion of an acid-regenerated cation exchange resin until the solution is converted to a metal-free solution of phytic acid.

9. The process of preparing phytic acid from a water-insoluble phytate salt comprising preparing a slurry of the water-insoluble phytate, water and a sufficient proportion of a highly acid, water-soluble phytate salt, agitating said slurry until the water-insoluble phytate is substantially converted to a water-soluble phytate, and contacting the solution thus obtained with a sufficient proportion of an acid-regenerated cation exchange resin until the solution is converted to a metal-free solution of phytic acid.

References Cited in the file of this patent

UNITED STATES PATENTS

| Number | Name | Date |
|---|---|---|
| 2,479,062 | Artz | Feb. 14, 1950 |

OTHER REFERENCES

Iselin: J. Am. Chem. Soc., November 1949, vol. 71, pp. 3822 to 3825.

Kunin and Myers: Ion Exchange Resins, page 128 (1950).